United States Patent [19]

Orikasa

[11] Patent Number: 4,568,800
[45] Date of Patent: Feb. 4, 1986

[54] MULTI-CHANNEL ACCESS (MCA) RADIO TELEPHONE SYSTEM

[75] Inventor: Hiromi Orikasa, Tokyo, Japan

[73] Assignee: NEC Corporation, Tokyo, Japan

[21] Appl. No.: 594,672

[22] Filed: Mar. 28, 1984

[30] Foreign Application Priority Data

Mar. 30, 1983 [JP] Japan .................................. 58-56502

[51] Int. Cl.$^4$ ............................................. H04Q 7/04
[52] U.S. Cl. ................................. 179/2 EB; 179/2 E
[58] Field of Search ............................. 179/2 E-2 EC

[56] References Cited

U.S. PATENT DOCUMENTS

4,281,413  7/1981  Forrest ......................... 179/2 EB X
4,400,585  8/1983  Kaman et al. ..................... 179/2 EB

Primary Examiner—W. J. Brady
Attorney, Agent, or Firm—Laff, Whitesel, Conte & Saret

[57] ABSTRACT

A multi-channel access (MCA) radio telephone system completes calls from conventional telephone systems over a plurality of shared radio channels to a base station serving a plurality of substations connected to a second telephone set. The MCA radio telephone system provides a method for clearing calls after they are completed. The method comprising the steps of: (a) detecting the hang-up at the first and conventional set involved in the clearing call; (b) maintaining the D.C. loop of the subscriber line to the first and conventional telephone set in response to the detection of an on-hook signal and returning the radio channel to an idle and waiting state; (c) detecting the hang-up of the second telephone set which is served by the base station re-establishing a radio channel between the base station and the substation involved in the call being cleared; (d) sending a release signal from the clearing substation through the re-established radio channel to the base station; and (e) opening the D.C. loop to the first and conventional telephone set in response to the release signal and placing the re-established radio channel into an idle and waiting state.

14 Claims, 7 Drawing Figures

FIG. 5A CONCENTRATOR

FIG. 5B SUBSTATION

MULTI-CHANNEL ACCESS (MCA) RADIO TELEPHONE SYSTEM

BACKGROUND OF THE INVENTION

The present invention relates to a multi-channel access (MCA) radio telephone system and, more particularly, to a method for clearing such an MCA radio telephone system.

In a conventional MCA radio telephone system, such as a marine telephone system, a plurality of shore subscriber telephone sets are connected through a shore telephone exchange and a concentrator to a base station, which is coupled to a plurality of substations, such as ships, over a plurality of radio channels. In such a system, when a shore subscriber hangs up first, the clearing process can be accomplished by either one of the following two methods.

In the first method, in response to the hanging-up of the shore subscriber, the shore exchange sends a busy tone through the concentrator to the base station. The busy tone is further carried with the present radio channel from the base station to the substation the subscriber of which can hear the busy tone as an audible signal indicating that the shore subscriber had hung up. The substation subscriber, therefore, hangs up his own telephone set. Only then is the radio channel released, and thereby made available for use by another substation.

A disadvantage of this method is that the radio channel remains busy until the substation subscriber hangs up even though the call is finished. This is detrimental to the efficient utilization of radio channels in an MCA system, wherein these radio channels are shared by a plurality of substations.

In the second method, in response to the hanging-up of the shore subscriber, the shore exchange sends a busy tone to the concentrator which detects this busy tone and finds that the shore telephone is already on-hook. Also, the concentrator sends to the substation a signal (disconnection signal) to let it know that the shore subscriber has hung up. This disconnect signal releases the radio channel shared by a combination of the base station and the substation, and further releases the direct current (D.C.) loop of the line connecting the subscriber to the shore exchange. Upon detection of the disconnect signal, the substation releases its radio channel and causes an internal circuit therein to generate a busy tone (a local busy tone), which is heard in the telephone set. This local busy tone keeps on sounding until the substation subscriber hangs up.

This method is favorable because it is a more efficient utilization of radio channels. Nevertheless, it has a disadvantage since the D.C. loop of the subscriber line is open as viewed from the shore exchange. Although the substation is deemed to have already hung up and to be ready to accept a call from the exchange, at any time, the telephone set connected to the substation is actually still off-hook, so that no call can be received as yet.

SUMMARY OF THE INVENTION

Therefore, an object of the present invention is to provide an MCA radio telephone system having a clearing method which permits an efficient utilization of radio channels.

Another object of the invention is to provide an MCA radio telephone system having a clearing method which is capable of avoiding a situation wherein another exchange subscriber originates a call to the substation subscriber during the clearing operation of a substation coupled to an exchange subscriber.

According to the present invention, a multi-channel access (MCA) radio telephone system completes calls over a plurality of radio channels shared by a combination of a base station coupled to a first telephone set, and a plurality of substations connected to a second telephone set. The MCA radio telephone system provides a method for clearing calls comprising the steps of:

(a) detecting the hanging-up at the first telephone set;

(b) maintaining the D.C. loop of the subscriber line of the first telephone set in response to the detection of the hung-up state and returning the radio channel to a waiting state;

(c) detecting the hanging-up of the second telephone set and again establishing a radio channel between the base station and the substation;

(d) sending through the re-established radio channel a release signal from the substation to the base station; and (e) opening the D.C. loop in response to the release signal and placing the re-established radio channel into an idle and waiting state.

BRIEF DESCRIPTION OF THE DRAWINGS

The foregoing and other objects, features and advantages of the present invention will become more apparent from the detailed description hereunder taken in conjunction with the accompanying drawings, wherein.

DETAILED DESCRIPTION OF THE EMBODIMENT

Figure 1:
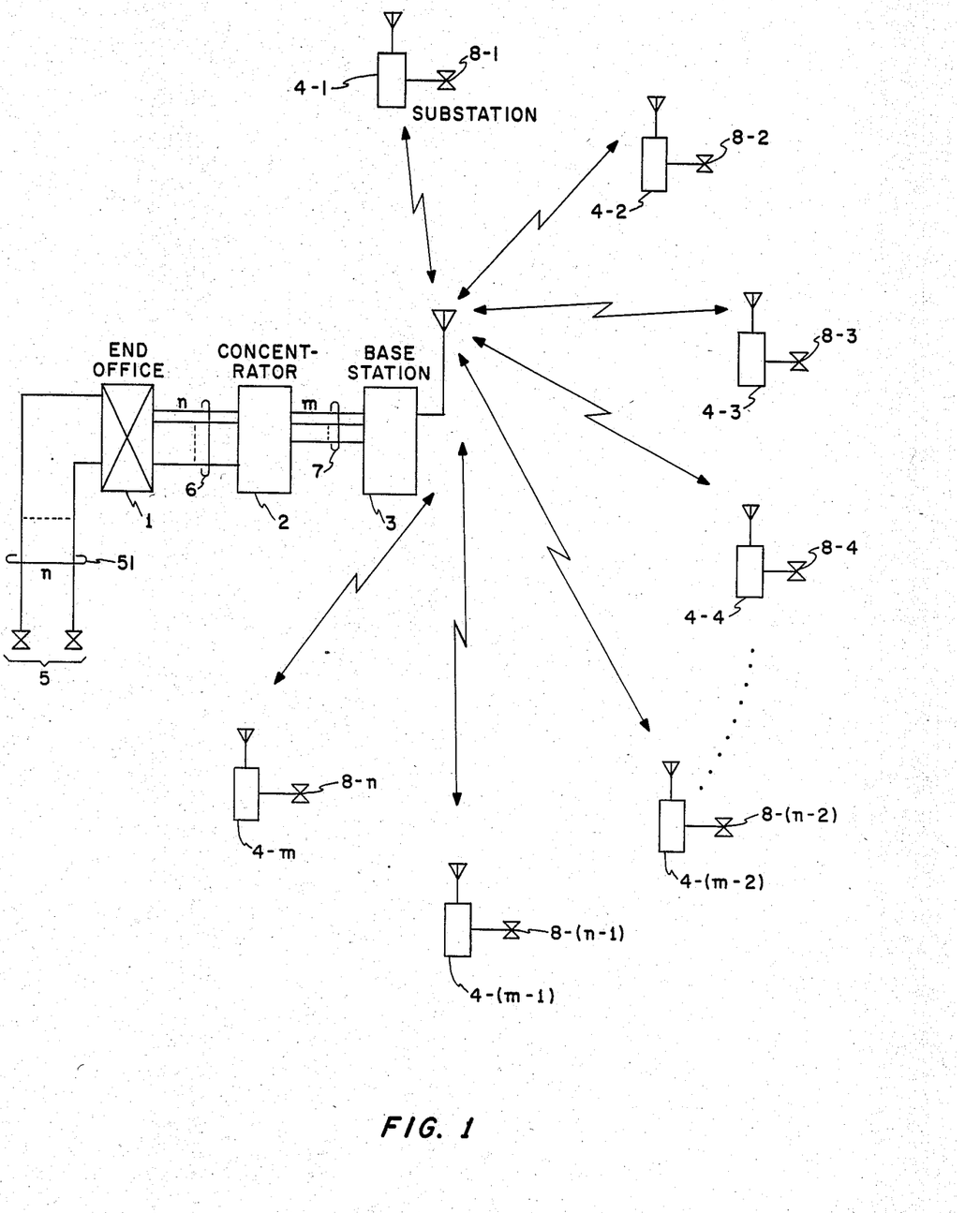
FIG. 1 is a schematic block diagram of an MCA radio telephone system according to the present invention.

Referring to FIG. 1, a telephone exchange 1 is a central office, local, or an end office (EO), which is either directly or through a toll office connected to subscriber lines 51, to which n (n is a positive integer) subscriber stations or telephone sets 5 are connected, respectively. A concentrator 2 is connected to the end office 1 by n pairs of subscriber lines 6. The concentrator 2 concentrates (or conversely deconcentrates) n pairs of subscriber lines 6 into m pairs of subscriber lines 7, which are connected to a radio base station 3. The letter m is a positive integer and generally is no greater than n, because that gives an efficient utilization of frequencies. More specifically, the number of transmitter/receivers at the base station 3 is reduced if the radio telephone system is a frequency division multiple (FDM) system; or, the frame length is shortened if it is time division multiple (TDM) system. The radio base station 3 has transmitter/receivers corresponding to the FDM or TDM system and constitutes m radio channels. Around this radio base station 3 are geographically scattered a plurality of substations 4-1 to 4-$m$, which can be connected by radio channels to the base station 3. To each of the substations 4-1 to 4-$m$ are connected one or more telephone sets 8. The number of the telephone sets 8 in the whole system is n, corresponding to the n pairs of subscriber lines 6.

Next will be briefly described the channel composition of the MCA radio telephone system. The system is classified into two types: one type comprising one or more control channels and a plurality of speech channels and the other type comprising only a plurality of speech channels. In the other type system, an idle signal is transmitted from the concentrator 2 on every idle speech channel. A substation originating a call scans all the speech channels and transmits an origination signal and an identification number (ID No.) signal via one of the channels on which the idle signal is detected. When a substation is to receive a call, the concentrator 2 transmits a paging signal on any or specific one of the idle speech channels. Upon receiving the signal, the called substation performs the remainder of the connecting process and then begins conversation.

In the system of the former type, the concentrator 2 transmits idle speech channel information on one of the control channels. A substation originating a call selects an idle speech channel according to the idle speech channel information on the control channel. The calling substation tunes to the idle channel to transmit an origination signal and its ID No. signal thereon. When a substation is to receive a call, the concentrator 2 transmits to the called substation via one of the control channels. The transmission includes a channel designation signal to which the selective call signal for the substation has been added. Since each substation is waiting on one of the control channels, the called substation tunes in to the designated speech channel upon detection of its channel designation signal. Then, the called substation performs the remainder of the connection process and begins conversation. The inventive clearing method used in the MCA radio telephone system is applicable to both of the aforementioned two types of systems.

Figure 2:
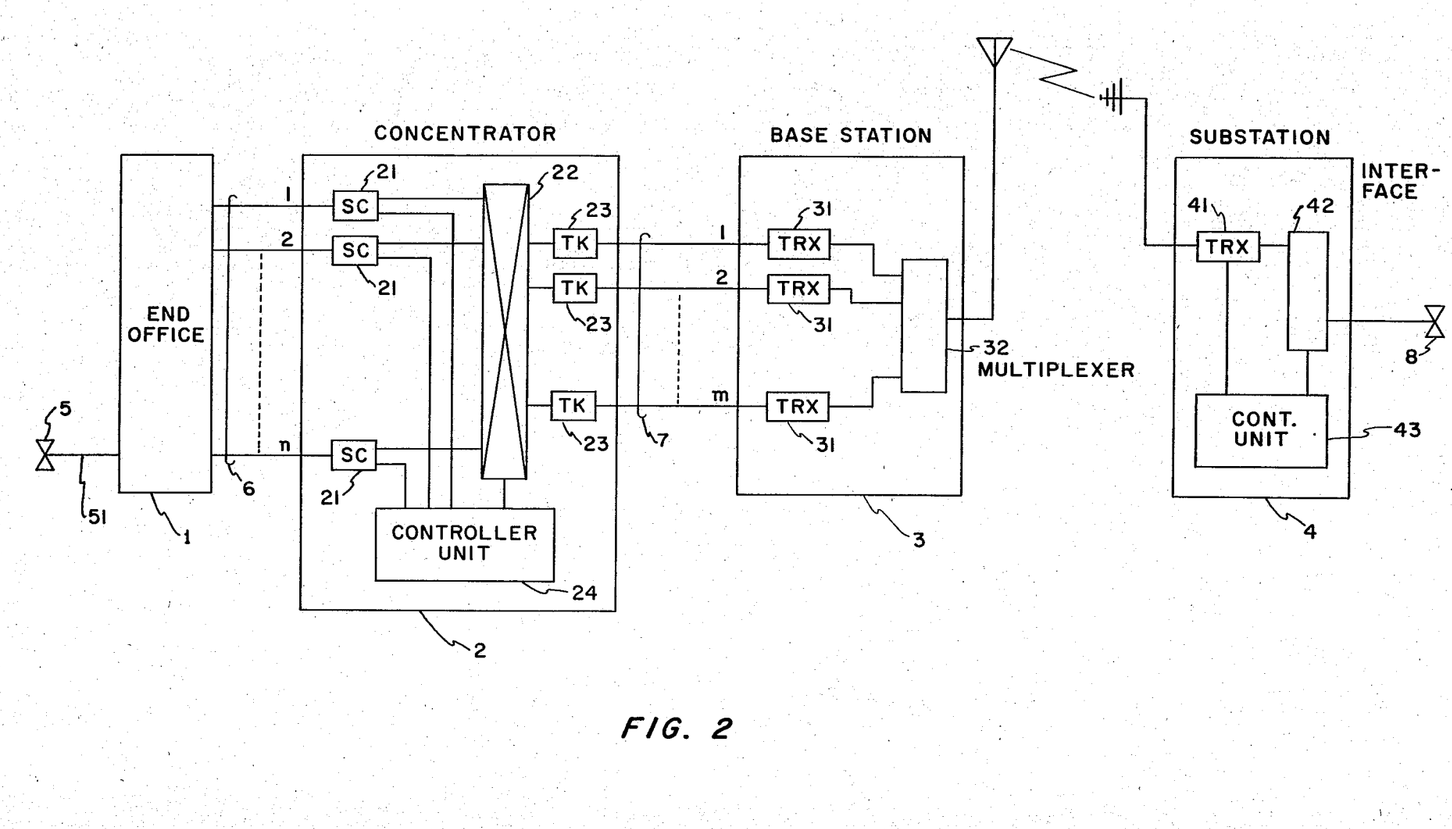
FIG. 2 is a block diagram of the concentrator, base station and substation in the MCA radio telephone system illustrated in FIG. 1.

Referring now to FIG. 2, the concentrator 2 comprises subscriber circuits 21, each corresponding to one of the n pairs of subscriber lines 6, a switching network 22, trunk circuits 23, each corresponding to one of the m pairs of subscriber lines, and a controller unit 24 for controlling the trunk circuits 21 and the switching network 22. The radio base station 3 has transmitter/receivers 31, each corresponding to one of the m pairs of subscriber lines multiplexer 32 and an antenna. While the base station 3 in this instance uses the FDM system, a TDM base station would need only one transmitter/receiver and memory circuits, each corresponding to one of the subscriber lines 7. The controller unit 24 is responsible for the selection of the subscriber circuit 21 and trunk circuit 23 to be used and for the control of the connection completed via the switching network 22. The unit 24 also transmits pertinent control signals, such as the idle signal, to substations by way of the trunk circuits 23.

The flow of voice signals after the establishment of a speech channel is as follows. A voice signal from the telephone set 5 enters the end office 1 by way of a subscriber line 51, and passes through one of the subscriber lines 6 to the corresponding subscriber circuit 21. Then the voice signal is supplied, from subscriber circuit 21 through the trunk circuit 23 and subscriber line 7 to the corresponding transmitter/receiver 31. The signals are multiplexed at 32 and radiated from the antenna to the desired substation 4. The radiated voice signal is received by the transmitter/receiver 41 of the substation and sent to the telephone set 8, through an interface circuit 42. A voice signal from the substation telephone set 8 reaches the telephone set 5 via the same route, with transmission in the reverse direction.

Figure 3:
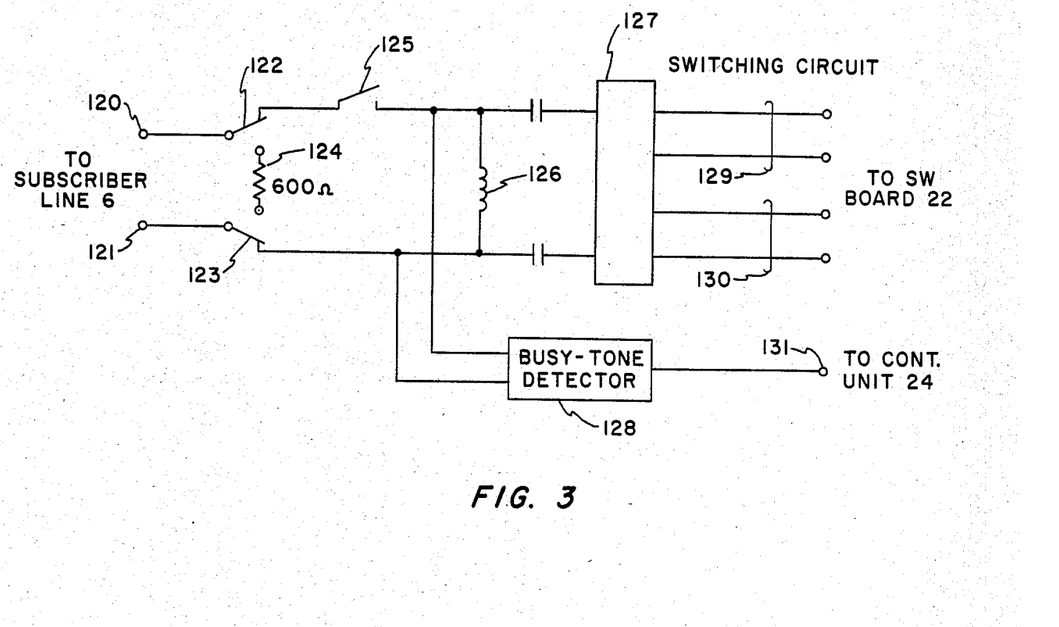
FIG. 3 is a schematic circuit diagram of the subscriber circuit referred to in FIG. 2.

FIG. 3 is a circuit diagram illustrating a part of the subscriber circuit 21 of the concentrator 2 shown in FIG. 2. Reference numerals 120 and 121 identify terminals to which a pair of subscriber lines 6 (leading to subscriber stations) are connected; 122 and 123, switching circuits; and 124, a resistor forming a terminating circuit. In a line-locked state to be described in detail with reference to FIGS. 4A and 4B, the switching circuits 122 and 123 terminate the subscriber line 6 with the terminating circuit 124. Reference numeral 125 identifies another switching circuit for forming a direct current (D.C.) loop, and 126, an inductance, which has a low resistance to a D.C. signal and a high impedance to the voice signal (0.3 kHz to 3.4 kHz). Upon formation of a D.C. loop by the switching circuit 125, a D.C. signal flows from terminal 120 through the switching circuit 122, switching circuit 125, inductance 126, switching circuit 123 and terminal 121, in that order. Or, the current may be in the completely opposite direction if the polarity of the D.C. signal is reversed. Reference numeral 127 identifies a 4-line/2-line converter circuit; 129, an outgoing speech line for feeding voice signals to the base station side; 130, another and incoming speech line for feeding voice signals to the end office side; 128, a busy tone detector; and 131, a terminal for detection of the busy tone. The busy tone detection signal at terminal 131 is supplied to the controller unit 24 (FIG. 2). The opening and closing of the switching circuits 122, 123 and 125 are controlled by the controller unit 24.

Figure 4A:
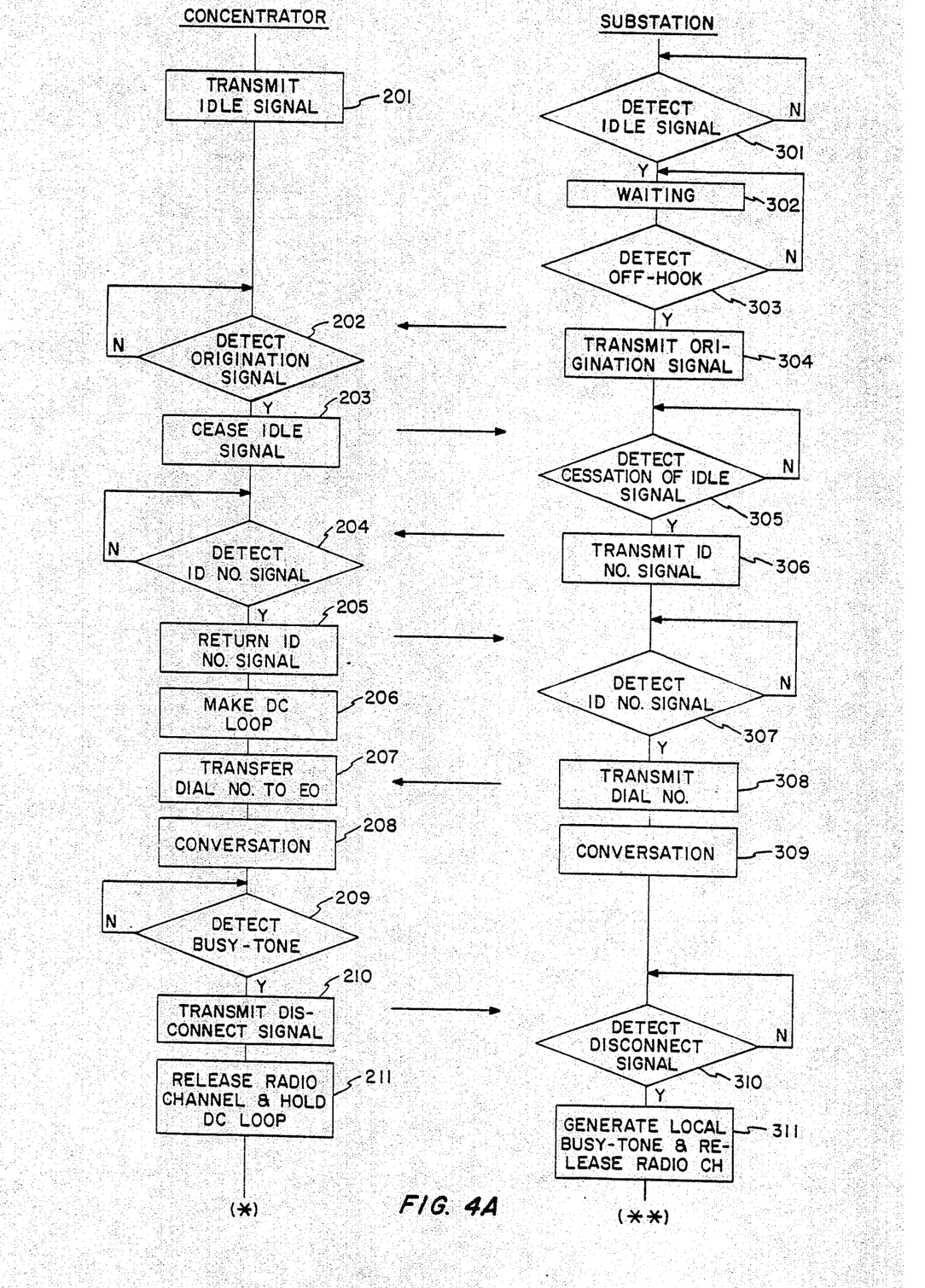
FIGS. 4A and 4B are flow charts showing the clearing method relating to the present invention.
Figure 4B:
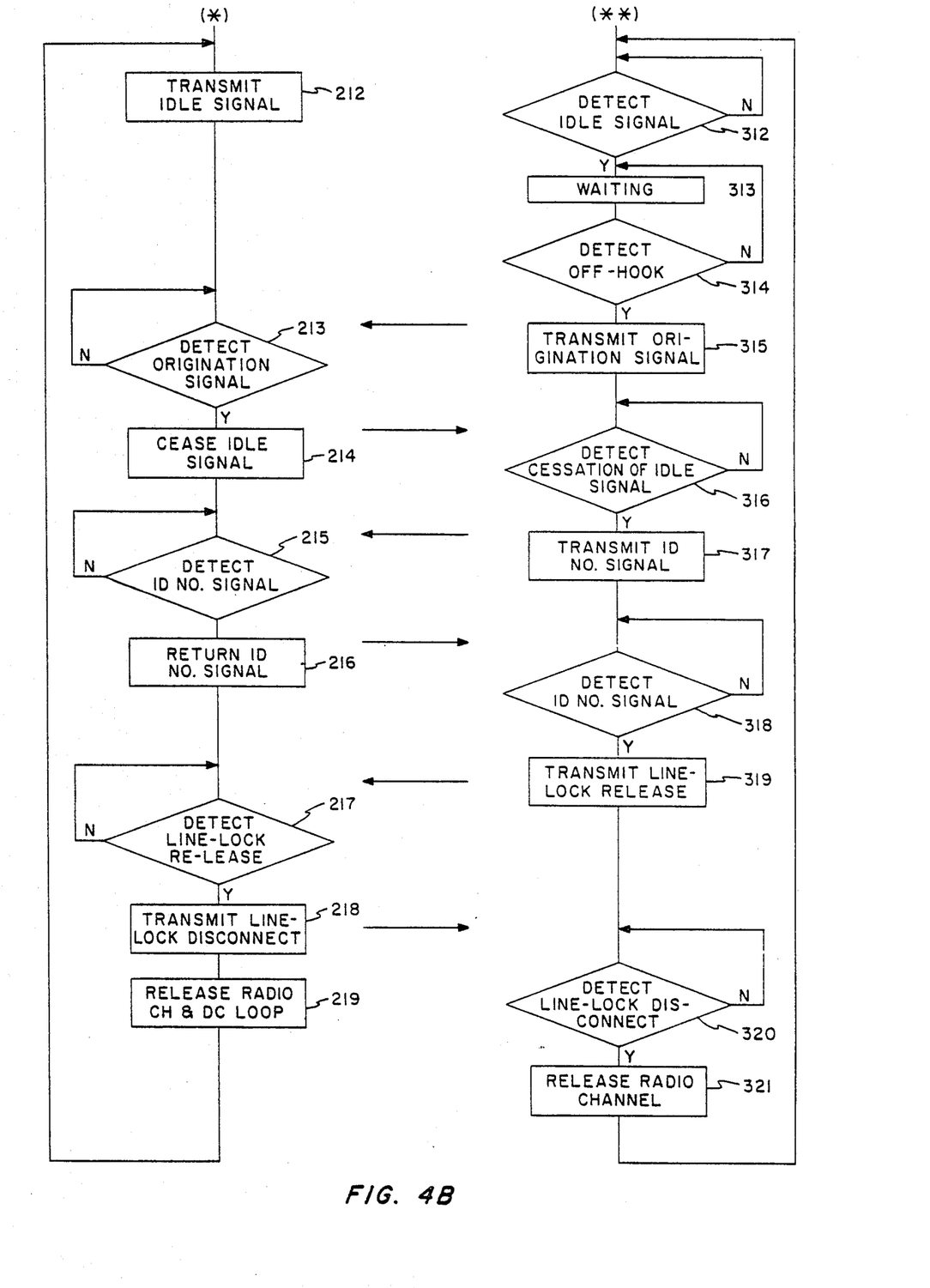

Next will be described in detail the inventive clearing method, with reference to FIGS. 4A and 4B. The flow charts of FIGS. 4A and 4B represent an MCA telephone system which has no control channel that is separate from speech channels. The call described in these flow charts is originated by a substation 4. It has to be noted, however, that the inventive clearing method can also be applied even if the channel composition is different and if a call is received by a substation, as described earlier.

In both FIGS. 4A and 4B, the flow on the left hand side is that of the controller unit 24 of the concentrator 2. The flow on the right hand side is that of the controller unit 43 of the substation 4.

In FIG. 4A, the concentrator 2 transmits (at Step 201) an idle signal on an idle speech channel.

When the substation 4 originates a call, it first detects (at Step 301) the idle signal on one of the speech channels. At Steps 302 and 303, the off-hook state is detected. When the substation subscriber raises the handset off-hook, the substation actuates (at Step 304) its transmitter/receiver and, at the same time, transmits an origination signal to the concentrator 2, via the base station 3.

The concentrator, detecting this origination signal (at Step 202), ceases (at Step 203) to transmit the idle signal on the particular speech channel over which the origination signal has been sent. The substation detects the cessation of the idle signal (at Step 305) and transmits (at Step 306) its own identification number (ID No.) signal for loop checking. The concentrator detects the ID No. signal from the substation (at Step 204) and sends back (at Step 205) this ID No. signal together with a dial tone from the end office 1 (FIG. 1). The concentrator also forms (at Step 206) a D.C. loop across the subscriber line 6 which extend from the end office 1. The end office 1 detects the formation of the D.C. loop, finds that the substation has originated a call, and supplies the dial tone to the concentrator.

The substation subscriber, hearing the dial tone from the end office, dials (at Step 308). The concentrator passes on (at Step 207) this dial number signal to the end office, which calls the desired subscriber telephone 5. As the called subscriber raises the handset off-hook, the speech path is enabled (at Steps 208 and 309). The procedures of these Steps 201 to 208 and 301 to 309 are the same as those of the conventional MCA telephone system.

Next will be described the clearing method which is characteristic of the present invention. This clearing takes effect when the first subscriber to hang up is at the telephone set 5 which is connected to the end office 1. In response to the hanging-up by the subscriber at the telephone set 5 (FIG. 1), the end office 1 transmits a busy tone by way of the subscriber line 6 to the concentrator 2. At Step 209 (FIG. 4A), the concentrator detects this busy tone, by the use of the busy tone detector 128 (FIG. 3), and transmits (at Step 210) a disconnection signal to the substation 4. Further, (at Step 211), the concentrator releases the radio speech channel and connects the terminating circuit 124 across line 120, 121 at contacts 122, 123 to terminate the subscriber line 6, and hold the D.C. loop. The substation receives the disconnection signal (at Step 310), releases (at Step 311) the radio channel and at the same time generates a local busy tone.

Since the D.C. loop of the subscriber line 6 is now being maintained, as viewed from the end office 1, the busy tone continues to be transmitted. On the other hand, the local busy tone is generated from the substation. Thus, the busy/idle states of the base station and of the substation agree with each other. As a result, another subscriber connected to the end office 1 can hear the busy tone from the end office; therefore, he or she may not originate a call to the substation subscriber. The line state which occurs during the above described busy/idle agreement is referred to as a "line-locked" state. Because the radio channel is "off" in this line-locked state, another substation can use this radio channel, thus resulting in a more efficient utilization of radio channels.

Referring to FIG. 4B, when the subscriber at substation 4 hangs up the telephone set 8, under the line-locked state, the on-hook condition has to be made known to the concentrator 2. However, the radio channel used for the already ended conversation has been released and is now off. Thus, it cannot be used for transmitting this on-hook information. Therefore, a radio channel is again established in accordance with the principle of the MCA system. Thus, the Steps 212 to 216 and 312 to 317 in flow charts FIG. 4B are followed to re-establish the required radio channel in the same manner, as described for the prior art. These Steps are exactly the same as those of Steps 201 to 205 and 301 to 306, respectively, in FIG. 4A.

When its ID No. signal is confirmed (at Step 318), substation 4 transmits (at Step 319) a line-lock release signal. The concentrator receives the line-lock release signal (at Step 217 and then transmits a line-lock disconnect signal (at Step 218). Later (at Step 219), it again releases the radio channel, and also releases the D.C. loop of the subscriber line 6 by opening the path through the switching network 22 and trunk circuit 23. The substation 4 receives the line-lock disconnect signal (at Step 320), and again releases (at Step 321) the radio channel, to return to an idle and waiting state as indicated at 201, 301.

Figure 5A:
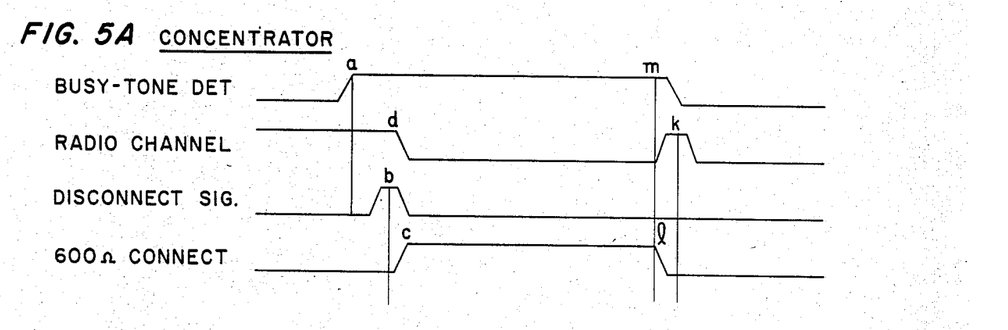
FIGS. 5A and 5B are time charts showing the segment of time from the busy tone detection to the clearing process completion, in the clearing method relating to the present invention.
Figure 5B:
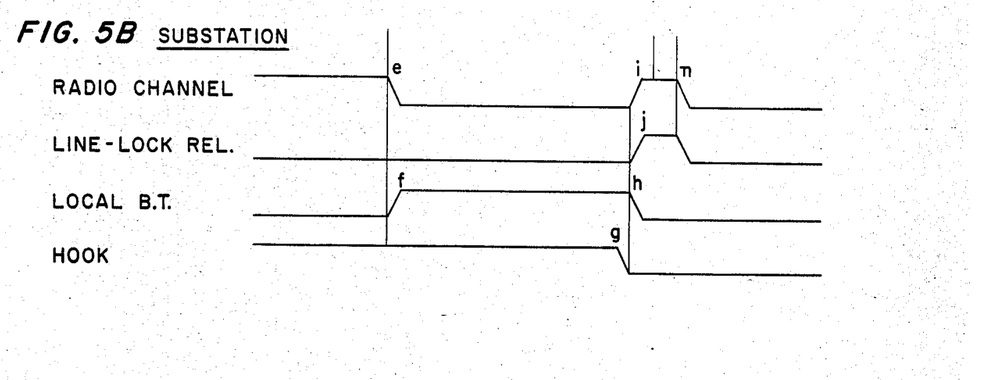

FIG. 5A is a time chart showing the time segments of the flow charts of FIGS. 4A and 4B, from the detection of busy tone at concentrator 2 (at Step 209) to the subscriber line release (at Step 219). FIG. 5B is a similar time chart showing the timing from the detection of a disconnection signal by substation 4 (at Step 310) to a release of the radio channel (at Step 321). The concentrator detects the busy tone at a time point a, transmits the disconnection signal to the substation at a time point b, terminates the subscriber lines with 600Ω resistance at a time point c, and discontinues transmission from the radio base station at a time point d. This discontinuation releases the radio channel to make it available for use by another substation.

The substation 4 receives the disconnection signal, discontinues its transmission at a time point e, and gives the local busy tone to its telephone set 8 at a time point f. The substation remains in this state as long as its telephone handset is off-hook. When the telephone handset is put on-hook at a time point g, the local busy tone is terminated at a time point h, transmission is re-established at a time point i, and the line-lock release signal is transmitted to the concentrator 2 at a time point j.

The channel over which the line-lock release signal is transmitted at time point j may be different from the channel that was used earlier for conversation. The concentrator, receiving the line-lock release signal, transfers this signal to the end office, re-establishes transmission, sends the line-lock disconnection signal to the substation at a time point k, and release the D.C. loop at a time point l. At a time point m, the busy tone from the end office is terminated. At a time point n, the substation turns off its transmission to complete the clearing process.

As heretofore described, the present invention enables radio channels to be more efficiently utilized because each channel is released at once when the subscriber on the end office side hangs up first, after the conversation has finished. Further, the D.C. loop is released by opening the terminating circuit in the concentrator 2 when the telephone set 8 on the substation 4 side is on-hook. The busy/idle state of the subscriber lines 5, as viewed from the end office side, and of the telephone set 8 connected to the substation 4 can be made to agree with each other.

Those who are skilled in the art will readily perceive how to modify the system. Therefore, the appended claims are to be construed to cover all equivalent structures which fall within the true scope and spirit of the invention.

What is claimed is:

1. A method for releasing and clearing a call made between a first telephone set coupled to a base station and a second telephone set coupled to one of a plurality of substations, said call being via an established radio channel in accordance with the principle of a multi-channel access radio telephone system, said radio channel extending between said base station and one of said substations that is associated with said call, each of said substations having at least a second telephone set individually associated therewith, said multi-channel access radio telephone system including the steps of:

(a) detecting on-hook conditions responsive to the hanging-up of said first telephone set;

(b) maintaining a direct current loop across a subscriber line individually associated with said first telephone set in response to said detection of the on-hook condition and returning the established radio channel to an idle and waiting state;

(c) detecting on-hook conditions responsive to the hanging-up of a second telephone set and against establishing a radio channel, in accordance with the principle of said multi-channel access radio telephone system between said base station and the one of said substations that is associated with the on-hook second telephone set;

(d) sending a release signal from said substation through the re-established radio channel to said base station; and (e) opening said direct current loop in response to said release signal and releasing said re-established radio channel into an idle and waiting state.

2. The method claimed in claim 1, and the added step of detecting the hanging-up of said first telephone set responsive to a busy tone sent from a side of said system to which said first telephone set is connected.

3. The method claimed in claim 1, wherein said Step (b) includes the steps of:

(b1) maintaining said direct current loop in response to the detection of the hanging-up of said first telephone set and sending a disconnect signal to said substation;

(b2) placing said base station into a waiting state after sending said disconnect signal; and (b3) generating a local busy tone at said substation in response to said disconnect signal and turning off said substation.

4. The method claimed in claim 1, wherein said Step (e) includes the steps of:

(e1) maintaining said direct current loop in response to the detection of the hanging-up of said first telephone set and sending a line-lock disconnect signal to said substation;

(e2) placing said base station into a waiting state after sending said disconnect signal; and (e3) turning off said line-lock substation in response to said line-lock disconnect signal.

5. The method claimed in claim 1, wherein said Step (c) includes the steps of:

(c1) detecting the hanging-up of said second telephone set and sending a call origination signal to said base station over a radio channel having an idle signal thereon;

(c2) removing said idle signal from said radio channel in response to said call origination signal;

(c3) sending an identification number signal of said substation from said substation over said radio channel to said base station in response to said removal of said idle tone;

(c4) returning said identification number signal from said base station over said radio channel to said substation; and (c5) completing the re-establishment of a radio channel responsive to a reception of the identification number signal returned by said substation.

6. A multi-channel access radio telephone system having an exchange accomodating a plurality of telephone sets; a base station coupled to said exchange by way of a plurality of first subscriber lines; a plurality of substations connected to said base station via a plurality of shared radio channels, each of said substations having at least one telephone set associated therewith; and a plurality of subscriber circuits coupled between said exchange and said base station, each of said subscriber circuits being individually associated with one of said first subscriber lines, each of said subscriber circuits having a busy tone detector for detecting a busy tone from the corresponding one of said first subscriber lines and a terminating circuit for forming a direct current loop by terminating said corresponding first subscriber line, said system comprising means responsive to a completion of a call between a first one of the plurality of telephone sets accommodated in said exchange and a second one among the telephone sets associated with said substations for operating said busy tone detector when said first telephone set is hung up first, means responsive to said operation of said busy tone detector for applying a termination to said direct current loop for maintaining a connection of said first subscriber line with said first telephone set involved in said completed call; means for thereafter releasing a radio channel between said base station and said substation; and means responsive to a hang-up at said second telephone set after release of said radio channel for re-establishing a radio channel between said base station and said substation; means in said substation for sending a release signal over said re-established radio channel to the subscriber circuit associated with said first telephone set; and means for opening said direct current loop by removing said terminating circuit in response to said release signal, and means for thereafter releasing said re-established radio channel.

7. A multi-channel access radio telephone system, as claimed in claim 6, wherein said radio channel is released responsive to a sending of a disconnect signal from said substation to said base station in response to the detection of the hanging-up of said first telephone set which terminates a transmission of said base station, and further terminates a transmission of said substation in response to said disconnect signal.

8. A multi-channel access radio telephone system, as claimed in claim 7, and means in said substation for supplying a local busy tone to said second telephone set in response to said disconnect signal.

9. A multi-channel access radio telephone system, as claimed in claim 6, wherein said subscriber circuit is in a concentrator coupled between said exchange and said base station, and said first subscriber lines comprising n pairs of subscriber lines extending between said exchange and said concentrator and m pairs of subscriber lines extending between said concentrator and said base station, said n and m being positive integers and n being greater than m.

10. A telephone system comprising a conventional central telephone exchange; a plurality of subscriber stations coupled to said central exchange via subscriber lines; a base station coupled to said central exchange; a plurality of substations coupled to said base station via shared radio channels; at least one telephone set coupled to each of said substations; whereby calls are completed between said subscriber stations and said telephone sets via said subscriber lines, central exchange, base stations, radio channels, and substations; means responsive to a completion of a call for dropping the radio channel involved in the completed call, whereby it immediately becomes available for use by other calls having shared access to the dropped radio channel; means at said central exchange responsive to the completion of a call for sending a busy tone to and for terminating the line of a pertinent subscriber station previously involved in said completed call, whereby said line is held by the termination; means at said base station for sending a disconnect signal to and for marking busy the pertinent substation previously involved in said completed call, whereby a line-locked state is established, means responsive to an on-hook signal at a pertinent telephone set previously involved in said completed call for re-establishing a radio channel between said pertinent substation and to said base station; and means for releasing the held line and the re-established radio channel, thereby terminating said line-locked state.

11. The telephone system of claim 10 and a concentrator interposed between said central telephone exchange and said base station for controlling the sharing of said radio channels, busy tone detector means at said concentrator, means responsive to the subscriber station going on-hook for transmitting busy tone, and means responsive to detection of said busy tone by said busy tone detector means for initiating said termination of said line-locked state.

12. The telephone system of claim 11 and two-to-four wire converter means in said concentrator for interfacing said central telephone exchange and said base station.

13. The telephone system of claim 11 and means for connecting a matched impedance resistance across the line of said pertinent subscriber station responsive to said busy tone detector detection of said busy tone, and means for disconnecting said resistance responsive to said re-established radio channel.

14. A telephone system comprising a plurality of land lines and a lesser plurality of radio channels which are shared by said land lines, concentration means for controlling the sharing of said radio channels by said land lines, means for completing calls between said radio channels and said land lines via said concentration means, means at said concentration means responsive to a completion of said calls for immediately dropping the radio channel involved in the completed call, whereby other land line immediately use the dropped radio channel, means at the opposite ends of said dropped radio channel responsive to a busy marking from equipment previously involved in said completed call for continuing marking busy and holding the equipment previously involved in said completed call, means responsive to an on-hook signal at equipment previously involved in said completed call for re-establishing a radio channel, and means responsive to signals transmitted over said re-established radio channel for dropping all equipment previously involved in said completed call, whereby said radio channels become available immediately after calls are completed and while the equipment involved in the completed call is still held busy until the substations previously associated with the completed call go on-hook.

* * * * *